United States Patent
Lefebvre et al.

(10) Patent No.: US 8,768,004 B2
(45) Date of Patent: Jul. 1, 2014

(54) METHOD FOR WATERMARK DETECTION USING REFERENCE BLOCKS COMPARISON

(75) Inventors: Frederic Lefebvre, Cesson Sevigne (FR); Severine Baudry, Cesson Sevigne Cedex (FR); Antoine Robert, Cesson Sevigne Cedex (FR)

(73) Assignee: Thomson Licensing, Issy les Moulineaux (FR)

( * ) Notice: Subject to any disclaimer, the term of this patent is extended or adjusted under 35 U.S.C. 154(b) by 173 days.

(21) Appl. No.: 13/543,860

(22) Filed: Jul. 8, 2012

(65) Prior Publication Data

US 2013/0011004 A1    Jan. 10, 2013

(30) Foreign Application Priority Data

Jul. 8, 2011   (EP) .................................. 11305881

(51) Int. Cl.
*G06K 9/00* (2006.01)
(52) U.S. Cl.
USPC .......................................... 382/100; 713/176
(58) Field of Classification Search
USPC ............ 382/100, 232; 380/54, 210, 252, 287; 713/176; 704/200.1, 273; 348/460, 463
See application file for complete search history.

(56) References Cited

U.S. PATENT DOCUMENTS

| | | | | |
|---|---|---|---|---|
| 5,787,203 A * | 7/1998 | Lee et al. | ....................... | 382/232 |
| 5,878,166 A * | 3/1999 | Legall | ............................ | 382/232 |
| 6,532,306 B1 * | 3/2003 | Boon et al. | ..................... | 382/232 |
| 6,594,311 B1 * | 7/2003 | Pearlstein | ................ | 375/240.01 |
| 7,386,147 B2 * | 6/2008 | Bodo et al. | ..................... | 382/100 |
| 7,415,127 B2 * | 8/2008 | Bodo et al. | ..................... | 382/100 |
| 7,782,938 B2 * | 8/2010 | Pearlstein | ................ | 375/240.01 |
| 8,121,341 B2 * | 2/2012 | Tapson et al. | .................. | 382/100 |
| 8,451,899 B2 * | 5/2013 | Park et al. | ................ | 375/240.16 |
| 8,494,060 B2 * | 7/2013 | Park et al. | ................ | 375/240.24 |
| 8,588,459 B2 * | 11/2013 | Bloom et al. | ................. | 382/100 |
| 2004/0247154 A1 | 12/2004 | Bodo et al. | | |

FOREIGN PATENT DOCUMENTS

| WO | WO2008118146 | 10/2008 |
|---|---|---|
| WO | WO2008154041 | 12/2008 |

OTHER PUBLICATIONS

Huang Li et al, A robust Watermarking for MPEG-2? Digital Watermarking Springler Berlin Heidelberg Berlin Heidelberg, pp. 69-80, Aug. 24, 2009.
European Search report dated Nov. 8, 2011.

* cited by examiner

*Primary Examiner* — Anand Bhatnagar
(74) *Attorney, Agent, or Firm* — Robert D. Shedd; Patricia A. Verlangieri

(57) ABSTRACT

The invention relates to a method for decoding a watermark embedded in a video comprising blocks of samples representative of the video comprising the steps of determining in the video a location of a watermarked block; determining a location for each reference block among a plurality of reference blocks wherein a reference block is associated to a watermark value among a plurality of watermark values; comparing the watermarked block with each reference block; and identifying watermark value for the watermarked block from the results of the plurality of comparison. The method is remarkable in that each reference block is equally located in the video, for instance the pirated video, so that the plurality of comparisons between the watermarked block and each reference block is performed among the same video.

7 Claims, 3 Drawing Sheets

METHOD FOR WATERMARK DETECTION USING REFERENCE BLOCKS COMPARISON

This application claims the benefit, under 35 U.S.C. §119 of EP Patent Application11305881.2, filed 8 Jul. 2011.

FIELD OF THE INVENTION

The invention relates to watermark detection. More particularly the invention relates to a method for detecting a watermark embedded in a video comprising blocks of samples representative of said video.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Among many alternative copyrights managements systems, watermarking techniques hide binary information, called payload, into multimedia content in a robust and imperceptible manner. The embedded information can be used during forensics analysis to identify the source of an illegal copy. However when the watermarked video is camcorded, the watermark payload may be difficult to retrieve because of the impairments due to the capture. In particular, the video may undergo a luminance transform. Unfortunately, this transform will vary along time because of the automatic gain transform of the camcorder. It may also vary spatially because of non homogeneities of the display and the camcorder.

FIG. 1 illustrates prior art methods for detecting a watermark embedded in a video. A current frame 100 in a pirated watermarked video is processed for detecting the value X of the watermark carried by watermarked block 102. The pirated video is compared to the original master video to which the embedding watermark process is applied. A value computed on the watermarked block 103 in the original master video is compared to a value computed on the watermarked block 102 in the pirated video. In a variant, such value is the luminance computed for each sample of the block in the pixel domain representation of a video. Or in another variant, such value is the average luminance computed for the plurality of samples of the block in the pixel domain representation of a video Thus, in the variant of the average luminance, from the comparison between the average luminance of watermarked block 102 in the pirated video and the average luminance of the original block 103 in the master video. The value X of the watermark is determined as being equal to a '0', for instance corresponding to no luminance modification of the original block 103 in the master video or the value X of the watermark is determined as being equal to a '1' corresponding to a luminance modification of the original block 103 in the master video.

The detection method mentioned above will hence be inefficient when the video undergo a luminance transform. And more generally, depending on the value computed on the video, the method is sensitive to video transform. Besides the detection method mentioned above requires temporal registration and spatial registration between the pirated video and the master video in order to align frames 101 from master video and frames 100 of pirated video.

Thus known methods for watermark detection raise the issue of the robustness of the detection in view of luminance modifications or any video transform between master and pirated video.

A method for detecting a watermark embedded in a video resistant to video transform is therefore needed.

SUMMARY OF THE INVENTION

The purpose of the invention is to overcome at least one of the disadvantages of prior art by proposing a method for detecting watermark robust to luminance variation. The idea of the invention is to compare the watermarked block to potential reference blocks in the same video rather than to the original value of the block in a master video. Thus, the potential reference blocks and the watermarked blocks, belonging to the same pirated video, undergoes the same luminance transform making the detection more robust. Besides, the method is efficient since it does not require temporal nor spatial registration between videos.

To this end, the invention relates to a method for decoding a watermark embedded in a video comprising blocks of samples representative of the video comprising the steps of determining, in the video, a location of a watermarked block; determining a location for each reference block among a plurality of reference blocks wherein a reference block is associated to a watermark value among a plurality of watermark values; comparing the watermarked block with each reference block; and identifying watermark value for the watermarked block from the results of the plurality of comparison. The method is remarkable in that each reference block is equally located in the video, for instance the pirated video, the plurality of comparisons between the watermarked block and each reference block being thus performed among the same video. The invention presents a new efficient watermark detection method. The invention is advantageously well adapted to luminance variation along the time.

In a first preferred embodiment, the step of comparing in the video the watermarked block with each reference block comprises computing an Euclidian distance between the samples of the watermarked block and the samples of each reference block. In the first preferred embodiment, the step of identifying watermark value comprises selecting the watermark value associated to the reference block for which the Euclidian distance between the watermarked block and the reference block is the smallest. Such characteristic of the invention, proposes a comparison easy to compute.

In a second preferred embodiment, the step of comparing in the video the watermarked block with each reference block comprises computing the correlation between the samples of the watermarked block and the samples of each reference block. In the second preferred embodiment, the step of identifying watermark value comprises selecting the watermark value associated to the reference block for which the correlation between the watermarked block and the reference block is the highest. Such characteristic of the invention, proposes a comparison more complex to compute, which give more accurate comparison result since the correlation operation corresponds to operation used in known compression standards.

According to a particularly advantageous characteristic of the invention, the samples representative of the video are chosen among luminance, chrominance, any combination of luminance and chrominance, frequency coefficient, statistical moment. According to another advantageous characteristic of the invention, the value of the watermarked block is determined during a watermark embedding process modifying a block of samples representative of a master video corresponding to the pirated watermarked video, wherein the blocks of samples representative of the pirated video and of the master video belongs to a compressed bit stream. In a variant, the embedding process modifies the motion vectors known in the bit stream compression algorithms resulting in a difference, for instance of the luminance, between the watermarked block and the block reconstructed, by the decompression algorithm, from the reference block. Advantageously, modifying a motion vector in the compressed domain representation instead of an average luminance of a block in a pixel-domain representation, allows comparing the watermarked block to reference blocks in the same pirated video.

The detection is advantageously compatible with watermark embedding performed on H264 video stream, according to the method described in the patent application WO 2008/154041 from the same applicant. In this method, the watermark is inserted by changing the motion vector (MV) of some blocks of inter predicted images. The selection of alternative motion vectors is done so that the average luminance of the reconstructed block is different when a '0' or when a '1' is embedded. According to the detection method described in WO 2008/154041, the average luminance of the blocks in the pirated video is compared to the average luminance of the blocks corresponding to watermark bit '0' and '1'. The best prediction value gives the embedded bit.

According to another particularly advantageous characteristic of the invention, the location of a watermarked block and of reference blocks is determined from metadata computed during the watermark embedding process. In a variant, the location of reference blocks is determined from an analysis of the video. In another variant, the location of a watermarked block comprises a frame identifier and a block identifier for the pixel-domain representation of the video. In another variant, the location of reference blocks comprises a frame identifier and optionally a block identifier for the pixel-domain representation of the video The detection is advantageously compatible with watermark embedding performed in WO/118145 wherein metadata is generated for the embedding step.

BRIEF DESCRIPTION OF THE DRAWINGS

Other characteristics and advantages of the invention will appear through the description of a non-limiting embodiment of the invention, which will be illustrated, with the help of the enclosed drawings.

In the figures, the represented blocks are purely functional entities, which do not necessarily correspond to physically separate entities. These functional entities may be implemented as hardware, software, or a combination of software and hardware; furthermore, they may be implemented in one or more integrated circuits.

DETAILED DESCRIPTION OF PREFERRED EMBODIMENTS

Figure 1:
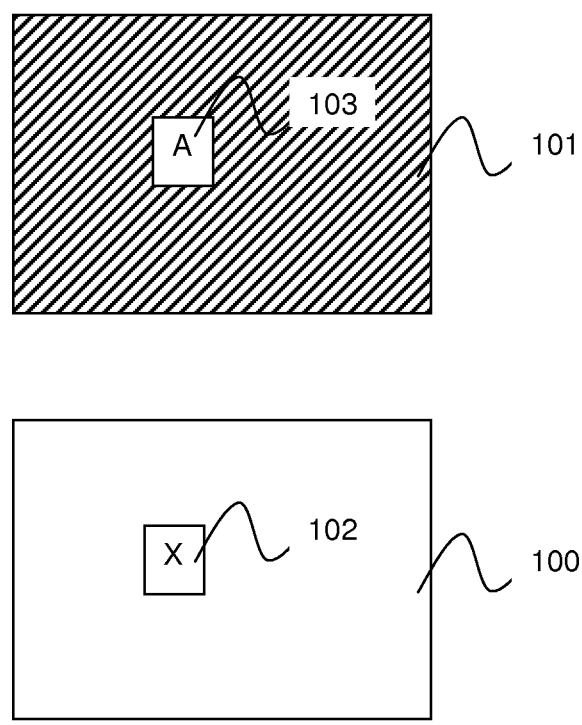
FIG. 1 illustrates a prior art method for detecting watermark in a video.
Figure 2:
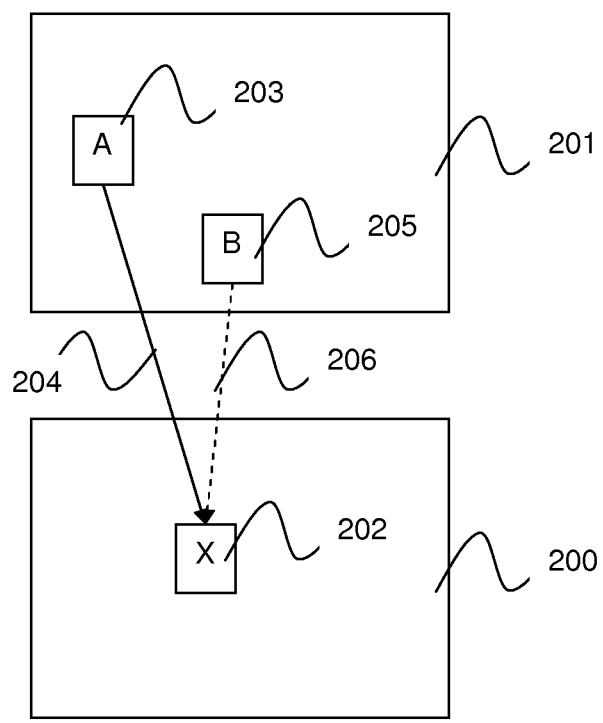
FIG. 2 illustrates the method for detecting watermark in a video according to a particular embodiment.

FIG. 2 illustrates the method for detecting watermark in a video according to a particular embodiment. Since, the invention relies on comparing the watermarked block and reference block in the same video, in the following sections of the description, the video should be understood as the watermarked pirated video to which the detection method is applied. According to the described embodiment, the blocks of samples are selected in the pixel domain representation of the video. Compression standards, from MPEG1 to the latest development of MPEG4, comprise a prediction, either spatial or temporal depending on the compression standard, of blocks from reference blocks. The residual is known as the difference between the original block and the predicted or reconstructed block.

A watermark location 202 is determined in a frame 200 of the video. Watermark locations are determined at the watermark embedding process.

The block X located at such watermark location 202 is supposed to carry a payload bit, called P. In a variant where the payload is binary coded represented in FIG. 2, the payload bit is selected among the watermark values '0' and '1'. Two potential reference blocks A and B, respectively corresponding to payload bit '0' and payload bit '1' are also determined in a frame 201 of the video. Reference blocks are determined by the compression algorithm and the watermarking data. The determination of the potential reference blocks is adapted to the watermark embedding method and is further described according to different embodiments. Naturally the invention is not limited to binary code, but is compatible with q-ary code resulting in q potential reference blocks. The candidate block X is respectively compared to potential reference block A, and to potential reference block B. The computation of the comparison between candidate block X and reference blocks is adapted to the watermark embedding method and is further described according to different embodiments. From the results of the comparison, either reference block A or reference block B is determined as being the best prediction. When block A is determined as being the best prediction of block X, the decoded bit is assessed to be '0'. When block B is determined as being the best prediction of block X, the decoded bit is assessed to be '1'. Since candidate block X and reference blocks A B belong to frames of the same video, they undergo same luminance transform. Besides the frames, which the different blocks belongs to, are relatively close one from each others, thus the time drifting of the luminance transform is not sensitive.

According to a first preferred embodiment, a watermark location 202 is selected among Inter predicted frames 200. The block X on the Inter predicted frame 200 is constructed by motion compensation. Thus the block $X^0$, corresponding to a block X watermarked with payload bit '0', is used:

$$X^0 = A + R$$

with A being the reference block in the reference frame 201, and R being the residual block. The residual block is the difference between the original blocks and the predicted (or reconstructed) block. If motion compensation is efficient, R should have low energy.

When X is watermarked with payload bit '1', the motion vector used for motion compensation is different, thus the reference block B is used instead, hence:

$$X^1 = B + R$$

The idea of the method according to a preferred embodiment of the invention is to check whether the best prediction for candidate block X correspond to reference block A or to the reference block B. The energy of the difference between the watermarked block and both possible reference blocks is therefore computed:

$$E_A = \|X-A\|^2$$

$$E_B = \|X-B\|^2$$

When X has payload bit '0' corresponding to original motion vector 204, then:

$$E_A = \|R\|^2$$

$$E_B = \|A-B+R\|^2$$

When X has payload bit '1' corresponding to alternative motion vector 206, then instead:

$$E_A = \|B-A+R\|^2$$

$$E_B = \|R\|^2$$

Thus a reference block B which is different enough from a reference block A and an efficient the motion compensation result in:

$$\|R\|^2 << \|B-A+R\|^2 \text{ or } \|R\|^2 << \|A-B+R\|^2$$

Hence, comparison between $E_A$ and $E_B$ determines the payload bit: if $E_A < E_B$ a payload bit '0' for block X is decoded, if $E_A > E_B$ a payload bit '1' for block X is decoded.

The correspondence between the payload bit (either '0' or '1') and the motion vector (either not modified or modified) is a convention which can change. This change possibly occurs for different bit of the whole payload embedded through the video. This information is possibly carried by metadata.

According to a variant embodiment, the correlation is used instead of Euclidean distance. The correlation with reference block A and reference block B is computed:

$$C_A = \langle X; A \rangle$$

$$C_B = \langle X; B \rangle$$

The correlation is either computed for each sample or pixel of the block, or for the average value of the samples or pixels of the block. In this variant, the decoded bit is given by the highest correlation value.

According to another variant embodiment, a comparison between X−A and X−B relatively to the expected residual R is computed. For instance, the value $D_A$ and $D_B$ are computed:

$$D_A = \frac{\langle X - A; R \rangle}{\|X - A\|}$$

$$D_B = \frac{\langle X - B; R \rangle}{\|X - B\|}$$

In this variant, the decoded bit is given by the highest value.

It will thus be appreciated that the present invention provides a method for detecting watermark robust to unknown luminance transform on a pirated video. The invention also advantageously allows watermark detection without a preliminary step of luminance registration.

Figure 3:
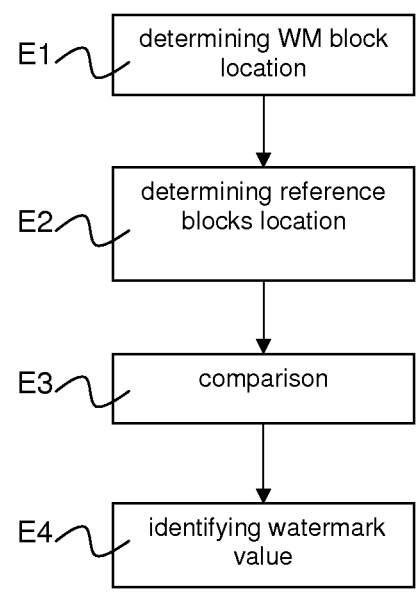
FIG. 3 represents the method of watermark detection according to a particular embodiment.

FIG. 3 represents the method of watermark detection according to a particular embodiment. In a first step E1, a watermarked block location is determined. The location of a watermarked block for instance comprises a frame identifier and a block identifier in the video. Advantageously, some metadata is generated at the embedding step of the watermark for decoding purpose. Thus metadata comprises data among which a frame identifier for watermarked blocks, a frame identifier for reference blocks, a block identifier in the frame for watermarked blocks in the pixel-domain representation of the video, a watermarked value, and associated motion vectors. Thus in a variant the location of a watermarked block is determined from the frame identifier and block identifier for the watermarked blocks, computed during the watermark embedding process and carried in the metadata of the video.

In a second step E2, reference blocks location are determined in the same video. As for watermarked blocks, the location of reference blocks is computed from the metadata generated at the embedding step of the watermark. Thus in a variant the location of reference block is determined from a frame identifier for the reference blocks and from motion vectors for the watermarked block, computed during the watermark embedding process and carried in the metadata of the video. In second variant, the location of a watermarked block is determined from an analysis of the video In a third step E3, a comparison is carried out between reference blocks and the candidate watermarked block. The comparison comprises the computation of a Euclidian distance, a correlation, or a ratio respectively to the expected residual as previously detailed.

In a fourth step E4, the watermark value is identified from the results of the comparison as previously detailed.

The steps E1 to E4 are iterated for each candidate blocks X of the video. Steps E1 and E2 are performed in parallel or sequentially, in any order.

Each feature or variant disclosed in the description, in the claims or in the drawings may be provided independently or in any appropriate combination.

Naturally, the invention is not limited to the embodiments previously described.

In particular, the invention is compatible with any embedding process, even if metadata is not generated. The invention is compatible with q-ary watermark alphabet. The invention not limited to the 3 embodiments of comparison computation.

The invention claimed is:

1. A method for decoding a watermark embedded in a target video comprising blocks of samples representative of said target video, wherein watermark is embedded in an original video by modifying motion vectors of a compressed representation of the original video, the method comprising:

determining, in said target video, a location of a watermarked block from a first frame identifier and a first block identifier in a pixel-domain representation of said target video;

determining a location for each reference block among a plurality of reference blocks wherein each reference block is a potential prediction block also located in said target video and wherein said location of a potential prediction block is determined from a second frame identifier in a pixel-domain representation of said target video, the determined location of said watermarked block, and a potential motion vector, the potential motion vector being associated to a watermark value among a plurality of watermark values;

comparing said watermarked block with said each reference block;

identifying watermark value of said watermarked block, wherein the identified watermark value is associated to the potential motion vector used to determine the reference block that corresponds to the best prediction for the watermarked block from the results of the plurality of comparisons.

2. The method according to claim 1 wherein comparing in said target video said watermarked block with said each reference block comprises computing an Euclidian distance between the samples of said watermarked block and the samples of said each reference block.

3. The method according to claim 1 wherein comparing in said target video the watermarked block with said each reference block comprises computing the correlation between the samples of said watermarked block and the samples of said each reference block.

4. The method according to claim 2 wherein identifying watermark value comprises selecting the watermark value associated to the potential motion vector used to determine the reference block for which the Euclidian distance between said watermarked block and the reference block is the smallest.

5. The method according to claim 3 wherein identifying watermark value comprises selecting the watermark value associated to the potential motion vector used to determine the reference block for which the correlation between said watermarked block and the reference block is the highest.

6. The method according to claim 1 wherein the samples representative of said video are chosen among luminance, chrominance, any combination of luminance and chrominance, frequency coefficient, statistical moment.

7. The method according to claim 1 wherein said first frame identifier, said first block identifier for watermarked block, said second frame identifier, said potential motion vectors are carried by metadata embedded in the target video.

\* \* \* \* \*